(12) United States Patent
Wu et al.

(10) Patent No.: US 9,164,729 B2
(45) Date of Patent: Oct. 20, 2015

(54) METHOD AND APPARATUS FOR GENERATING RANDOM NUMBERS USING A PHYSICAL ENTROPY SOURCE

(71) Applicant: QUALCOMM Incorporated, San Diego, CA (US)

(72) Inventors: Wenqing Wu, San Diego, CA (US); Peiyuan Wang, San Diego, CA (US); Raghu Sagar Madala, San Diego, CA (US); Senthil Kumar Govindaswamy, San Diego, CA (US); Kendrick H. Yuen, San Diego, CA (US); Robert P. Gilmore, Poway, CA (US); Jung Pill Kim, San Diego, CA (US); Seung H. Kang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 380 days.

(21) Appl. No.: 13/759,130

(22) Filed: Feb. 5, 2013

(65) Prior Publication Data
US 2014/0222880 A1 Aug. 7, 2014

(51) Int. Cl.
*G06F 7/58* (2006.01)

(52) U.S. Cl.
CPC . *G06F 7/58* (2013.01); *G06F 7/588* (2013.01)

(58) Field of Classification Search
CPC .......... G06F 7/588; G06F 7/58; G06F 7/584; G06F 7/582; H03K 3/84
USPC ................................................. 708/250–256
See application file for complete search history.

(56) References Cited

U.S. PATENT DOCUMENTS

| 8,289,759 B2 | 10/2012 | Wang et al. | |
|---|---|---|---|
| 8,374,021 B2 * | 2/2013 | Kanai et al. | 365/158 |
| 2010/0109660 A1 | 5/2010 | Wang et al. | |
| 2010/0131578 A1 | 5/2010 | Fukushima et al. | |
| 2011/0123022 A1 | 5/2011 | Oishi et al. | |
| 2012/0026784 A1 | 2/2012 | Kanai et al. | |

OTHER PUBLICATIONS

Elias, P., "The efficient construction of an unbiased random sequence", The Annals of Mathematical Statistics, 1972, vol. 43, No. 3, Jan. 1, 1972, pp. 865-870, XP055114425, Retrieved from the Internet: URL:http://projecteuclid.org/download/pdf_1/euclid. aoms/1177692552 [retrieved on Apr. 16, 2014] the whole document.
International Search Report and Written Opinion—PCT/US2014/014507—ISA/EPO—Apr. 30, 2014.
Tanamoto, T., et al., "High-Speed Magnetoresistive Random-Access Memory Random Number Generator Using Error-Correcting Code", Japanese Journal of Applied Physics 50 (2011 ), Jan. 1, 2011, pp. 1-5, XP055049429, DOI: 10.1143/JJAP.50.04DM01, Retrieved from the Internet:URL:http://jjap.jsap.jp/link?JJAP/50/04DM01/pdf.
[retrieved on Jan. 14, 2013], sections 1 and 2.2.

* cited by examiner

*Primary Examiner* — Tan V. Mai
(74) *Attorney, Agent, or Firm* — Muncy, Geissler, Olds & Lowe, P.C.

(57) ABSTRACT

A method and apparatus for generating random binary sequences from a physical entropy source having a state A and a state B by detecting whether the physical entropy source is in the state A or in the state B, attempting to shift the state of the physical entropy source to the opposite state in a probabilistic manner with less than 100% certainty, and producing one of four outputs based on the detected state and the state of the physical entropy source before the attempted shift. The outputs are placed in first and second queues and extracted in pairs from each queue. Random binary bits are output based on the sequences extracted from each queue.

34 Claims, 6 Drawing Sheets

METHOD AND APPARATUS FOR GENERATING RANDOM NUMBERS USING A PHYSICAL ENTROPY SOURCE

FIELD OF THE DISCLOSURE

The present disclosure is directed toward a method of using a physical entropy source as a random number generator (RNG) and toward an RNG including a physical entropy source, and, more specifically, toward a method of generating random numbers using a magnetic tunnel junction (MTJ) without setting a state of the MTJ between sequentially generated random numbers and toward an RNG configured to perform the method.

BACKGROUND

Bernoulli binary sequences are sequences of bits (e.g., 0's and 1's), in which each bit has a specific probability of being '1', which probability is independent of the value of any other bit in the sequence. Random binary sequences, sometime also loosely referred as "random numbers," are special cases of Bernoulli sequences in which the probability of any particular bit being '1' is 50%. Random binary sequences may be referred to as pseudo-random when they are calculated from a complex formula based on a seed value. However, the next pseudo-random numbers in a sequence may be predictable if the seed value and formula are known, and they often exhibit at least some degree of correlation. True, uncorrelated, random number can be generated by measuring or observing a physical entropy source which has an unpredictable state. Systems in which the state is based on a quantum mechanical phenomenon are particularly useful for generating random sequences in that the next state of the system is not merely difficult to predict but is unknowable.

Figure 1:
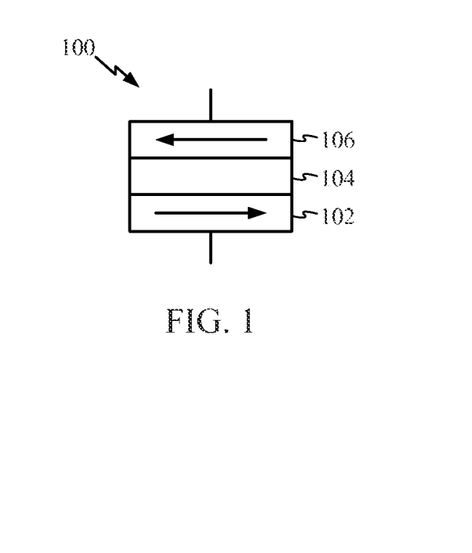
FIG. 1 is a schematic illustration of a spin-torque transfer (STT) magnetic tunnel junction (MTJ) element in an antiparallel state.
Figure 2:
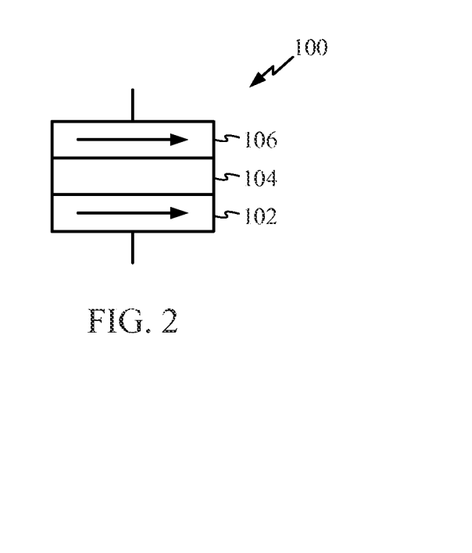
FIG. 2 is a schematic illustration of the STT-MTJ element of FIG. 1 in a parallel state.

A spin-torque transfer (STT) magnetic tunnel junction (MTJ) is an example of a physical entropy source that can exist in one of two binary states and in which switching between the states is probabilistic. STT-MTJ's are thus suitable for use as components of Bernoulli sequence or random number generators. FIGS. 1 and 2 illustrate an STT-MTJ element 100 formed from three layers: a fixed layer 102, a barrier layer 104, and a free layer 106. The fixed layer 102 and the free layer 106 are formed from ferromagnetic materials, and the magnetization direction of the fixed layer 102 is pinned or fixed. This layer may also be referred to as a "reference" layer. The magnetization direction of the free layer 106, on the other hand, can be changed by applying a current to the STT-MTJ element 100 and is switchable between a parallel state in which the magnetization direction of the free layer 106 is parallel to the magnetization direction of the fixed layer 102 and an antiparallel state in which the magnetization direction of the free layer 106 is opposite or antiparallel to the magnetization direction of the fixed layer 102. FIG. 1 shows the STT-MTJ element 100 in an antiparallel state, and FIG. 2 shows the STT-MTJ element 100 in a parallel state. This two-state device is usable as a memory element in which one of the parallel and antiparallel states represents a logical "0" and the other represents a logical "1."

Data is written into the STT-MTJ element 100 by spin-torque transfer magnetization switching. Applying a current to the STT-MTJ element 100 causes electrons to tunnel through the barrier layer 104 and affect the magnetization direction of the free layer 106. Applying the current in one direction switches the magnetization direction from parallel to antiparallel and reversing the current switches the magnetization state of the free layer 106 from antiparallel to parallel.

The STT-MTJ element 100 has a resistance value that depends on the magnetization direction of the free layer 106. Data is read from the STT-MTJ element 100 by causing a small read current to flow through the STT-MTJ element 100 and measuring the resistance of the STT-MTJ 100. The resistance of the STT-MTJ element 100 in the parallel state of FIG. 2 is typically about one half the resistance of the STT-MTJ element 100 in the antiparallel state.

As noted above, the switching of the STT-MTJ element 100 from one state to the other is probabilistic. The probability of the STT-MTJ element 100 switching from one state to the other is based on a combination of the level of voltage or current applied to the STT-MTJ element 100 and the time during which the voltage or current is applied. Thus higher voltages and currents can switch the STT-MTJ element 100 from one state to another in a shorter time than lower voltages or currents, and the longer that a voltage or current is applied, the greater the likelihood that state switching will take place. For discussion herein, it will be assumed that the switching probability is controlled by controlling the time during which a constant voltage (or a constant current) is applied to the STT-MTJ element 100.

Figure 3:
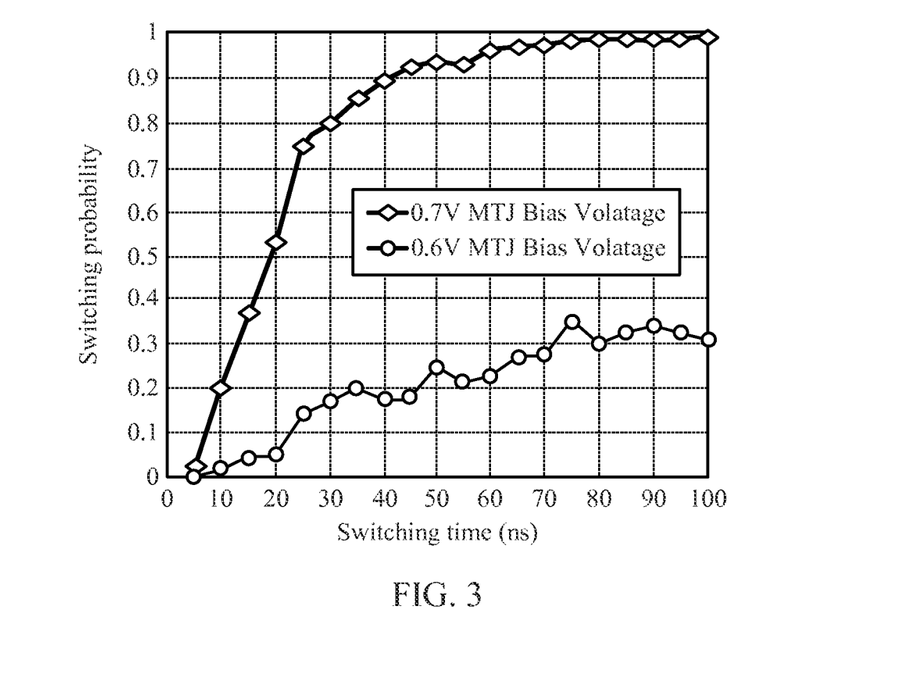
FIG. 3 is a graph showing a switching probability of the STT-MTJ element of FIG. 1 at different lengths of current application.

FIG. 3 is a graph of the probability of the STT-MTJ element 100 switching from one state to the other based on a time during which a particular switching voltage is applied. The lower line illustrates switching probabilities when a 0.6 volt reference voltage is applied, and the upper line illustrates switching probabilities when a 0.7 volt reference voltage is applied. At either voltage level, there is a very small probability of the STT-MTJ element 100 switching when the voltage is applied for a very short time. The lower line shows that, when 0.6 volts is applied to the STT-MTJ element 100 for longer times, the probability of switching increases, but that even after 100 ns, the probability of the STT-MTJ element 100 switching at 0.6 volts is less than 50%. When 0.7 volts are applied, however, the probability of the STT-MTJ element 100 switching is approximately 50% after about 20 ns. When 0.7 volts are applied for a longer time, the switching probability of the STT-MTJ element 100 becomes very close to 100% after 80 ns. FIG. 3 thus illustrates that for very short time periods, or at low voltage levels, the probability of switching the state of the STT-MTJ element 100 is approximately 0. Thus, the state of the STT-MTJ element 100 can be read by a read voltage that is low enough and/or of short enough duration to avoid switching the state of the STT-MTJ element 100.

A conventional random number generator based on an STT-MTJ element will set the state of the STT-MTJ to either parallel or antiparallel and then apply a signal thereto that has a 50% probability of switching the STT-MTJ element to the opposite state, and the state of the STT-MTJ element will then be measured. If the STT-MTJ element switched states, applying the opposite current will have a 50% chance of returning the element to its starting state. In order to produce a sequence of uncorrelated binary numbers with each bit in the sequence having a specific probability p of being 1 that is applicable to all bits in the sequence thus forming Bernoulli binary sequences with probability p being 1, it is generally necessary to set or reset the STT-MTJ element into a common known state after each attempt at switching or at least after each switching attempt that causes the STT-MTJ element to change states. And, as illustrated in FIG. 3, it takes a higher current and/or a longer time to switch the STT-MTJ element from one state to the other with switching probabilities that approach 100% (a 100% switching probability can only be reached in theory with infinite programming current pulse amplitude and width). Thus, setting or resetting the STT-MTJ element after even half of all measurements consumes a significant amount of power and time. Moreover, due the very nature of probabilistic switching, even after the setting or resetting of STT-MTJ with finite pulse amplitude and width, there is no guarantee that the common known state can be reached, hence jeopardize the prerequisite condition of generating a random sequence with each bit has the same probability p being 1.

Furthermore, it may be difficult if not impossible in practice to ensure that an STT-MTJ switches with exactly 50% probability. For example, process variations in the size or composition of the STT-MTJ or its component parts can cause switching variations in nominally identical STT-MTJ elements. Some applications require a random distribution of one and zeros that is exactly 50%. Fortunately, methods are known for producing series of random bits that have a probability of exactly 50% of being zero or of being one based on a random binary input that is not evenly distributed.

One such method is referred to as a randomness extractor, and one type of randomness extractor is known as a von Neumann extractor. A von Neumann extractor takes as input pairs of bits that are generated in an uncorrelated, random manner but which are not necessarily generated with a probability of 50%, and outputs a stream of bits with a probability of exactly 50% of having a given value. Input pairs that are identical are discarded or ignored. For pairs with different bits, the first bit in the pair is taken as the random number. Thus, for example, the input pairs (0,0) and (1,1) will be discarded, the pair (0,1) will be interpreted as a "0," and the pair (1,0) will be interpreted as a 1. If the probabilities of generating 1's and 0's are constant, albeit not exactly 50%, the product of the probability of obtaining a 0 and the probability of obtaining a 1 will be constant. Assuming for example, a 60% probability of obtaining a 0 and a 40% probability of obtaining a 1, the probability of obtaining either (0,1) or (1,0) will be 0.6 times 0.4 or 0.24, and this equal probability of each outcome guarantees a 50/50 distribution of 0's and 1's in an output of the extractor.

The use of a randomness extractor reduces the need to set a particular STT-MTJ to output exactly 50% of one bit value or the other. However, for efficiency reasons, it is generally desirable to calibrate the current application time so that each bit is output with about a 50% probability.

There are various electronic and computer related applications in which large numbers of random, uncorrelated, bits are needed at a high bit rate. These include, for example, probabilistic or stochastic computing and various cryptological methods. Random number generation is known to consume significant power, and the high bit rate of random number generation required for such applications consumes power at a rate that may cause heat dissipation problems and drain batteries or other power sources having a limited capacity. It would therefore be desirable to produce Bernoulli sequences more efficiently than conventional methods.

SUMMARY

Exemplary embodiments of the invention are discussed below, and a first aspect of the disclosure comprises a method for generating random binary sequences that comprises providing a physical entropy source having a state A and a state B, the states A and B being bi-stable states. The method includes providing first logic for placing the physical entropy source into the state A, the first logic placing the physical entropy source into the state A with a first probability of less than 100% when the physical entropy source is in the state B and placing the physical entropy source into the state A with a probability of 100% when the physical entropy source is in the state A, and providing second logic for placing the physical entropy source into a state B, the second logic placing the physical entropy source into the state B with a second probability of less than 100% when the physical entropy source is in the state A and placing the physical entropy source into the state B with a probability of 100% when the physical entropy source is in the state B. The method also includes a) detecting whether the physical entropy source is in the state A or in the state B, b) if the physical entropy source is in the state B, using the first logic to place the physical entropy source into the state A and if the physical entropy source is in the state A, using the second logic to place the physical entropy source into the state B, and c) determining whether the physical entropy source is in the state A or in the state B after using the first logic to place the physical entropy source into the state A or after using the second logic to place the physical entropy source into the state B. The method also includes d) if the detected state of the physical entropy source is the state B and the determined state of the physical entropy source is the state B, outputting a first symbol and if the detected state of the physical entropy source is the state B and the determined state of the physical entropy source is the state A, outputting a second symbol, and if the detected state of the physical entropy source is the state A and the determined state of the physical entropy source is the state A, outputting a third symbol, and if the detected state of the physical entropy source is the state A and the determined state of the physical entropy source is the state B, outputting a fourth symbol, wherein the first, second, third and fourth symbols are mutually distinguishable. The method further includes e) placing the first and second symbols into a first queue, f) placing the third and fourth symbols into a second queue, g) repeating actions a-f a plurality of times, h) extracting a pair of symbols from the first queue, i) generating a first value when the pair of symbols extracted from the first queue is a first queue first sequence and generating a second value different than the first value when the pair of symbols extracted from the first queue is a first queue second sequence different than the first queue first sequence, and j) outputting the first and second values as the random binary sequence.

Another aspect of the disclosure comprises an apparatus for generating a random binary sequence that includes a physical entropy source having a state A and a state B, the states A and B being bi-stable states, first logic for placing the physical entropy source into the state A, and second logic for placing the physical entropy source into a state B. The first logic is configured to place the physical entropy source into the state A with a first probability of less than 100% when the physical entropy source is in the state B and to place the physical entropy source into the state A with a probability of 100% when the physical entropy source is in the state A, and the second logic is configured to place the physical entropy source into the state B with a second probability of less than 100% when the physical entropy source is in the state A and to place the physical entropy source into the state B with a probability of 100% when the physical entropy source is in the state B. The apparatus includes a controller configured to: a) detect whether the physical entropy source is in the state A or in the state B and, if the physical entropy source is in the state B, to control the first logic to place the physical entropy source into the state A and if the physical entropy source is in the state A, to control the second logic to place the physical entropy source into the state B. The controller is also configured to b) determine whether the physical entropy source is in the state A or in the state B after action a is performed, and c) if the detected state of the physical entropy source is the state B and the determined state of the physical entropy source is the state B, to output a first symbol and if the detected state of the physical entropy source is the state B and the determined state of the physical entropy source is the state A, to output a second symbol and if the detected state of the physical entropy source is the state A and the determined state of the physical entropy source is the state A, to output a third symbol and if the detected state of the physical entropy source is the state A and the determined state of the physical entropy source is the state B, to output a fourth symbol, wherein the first, second, third and fourth symbols are mutually distinguishable. The controller is also configured to d) place the first and second symbols into a first queue, e) place the third and fourth symbols into a second queue, f) extract a pair of symbols from the first queue, g) generate a first value when the pair of symbols extracted from the first queue is a first queue first sequence and generate a second value different than the first value when the pair of symbols extracted from the first queue is a first queue second sequence, and h) output the first and second values as the random binary sequence.

Another aspect of the disclosure comprises a method for generating random binary sequences that includes steps for providing a physical entropy source having a state A and a state B, the states A and B being bi-stable states. The method includes steps for providing first logic for placing the physical entropy source into the state A, the first logic placing the physical entropy source into the state A with a first probability of less than 100% when the physical entropy source is in the state B and steps for placing the physical entropy source into the state A with a probability of 100% when the physical entropy source is in the state A, and steps for providing second logic for placing the physical entropy source into a state B, the second logic placing the physical entropy source into the state B with a second probability of less than 100% when the physical entropy source is in the state A and placing the physical entropy source into the state B with a probability of 100% when the physical entropy source is in the state B. The method also includes a) steps for detecting whether the physical entropy source is in the state A or in the state B, b) if the physical entropy source is in the state B, steps for using the first logic to place the physical entropy source into the state A and if the physical entropy source is in the state A, steps for using the second logic to place the physical entropy source into the state B, and c) steps for determining whether the physical entropy source is in the state A or in the state B after the steps for using the first logic to place the physical entropy source into the state A or after the steps for using the second logic to place the physical entropy source into the state B. The method also includes d) if the detected state of the physical entropy source is the state B and the determined state of the physical entropy source is the state B, steps for outputting a first symbol and if the detected state of the physical entropy source is the state B and the determined state of the physical entropy source is the state A, steps for outputting a second symbol, and if the detected state of the physical entropy source is the state A and the determined state of the physical entropy source is the state A, steps for outputting a third symbol, and if the detected state of the physical entropy source is the state A and the determined state of the physical entropy source is the state B, steps for outputting a fourth symbol, wherein the first, second, third and fourth symbols are mutually distinguishable. The method further includes e) steps for placing the first and second symbols into a first queue, f) steps for placing the third and fourth symbols into a second queue, g) steps for repeating actions a-f a plurality of times, h) steps for extracting a pair of symbols from the first queue, i) steps for generating a first value when the pair of symbols extracted from the first queue is a first queue first sequence and generating a second value different than the first value when the pair of symbols extracted from the first queue is a first queue second sequence different than the first queue first sequence, and j) steps for outputting the first and second values as the random binary sequence.

A further aspect of the disclosure comprises an apparatus for generating a random binary sequence that includes a physical entropy source having a state A and a state B, the states A and B being bi-stable states, first logic means for placing the physical entropy source into the state A, and second logic means for placing the physical entropy source into a state B. The first logic means is configured to place the physical entropy source into the state A with a first probability of less than 100% when the physical entropy source is in the state B and to place the physical entropy source into the state A with a probability of 100% when the physical entropy source is in the state A. The second logic means is configured to place the physical entropy source into the state B with a second probability of less than 100% when the physical entropy source is in the state A and to place the physical entropy source into the state B with a probability of 100% when the physical entropy source is in the state B. The apparatus also includes controller means for: a) detecting whether the physical entropy source is in the state A or in the state B and, if the physical entropy source is in the state B, controlling the first logic means to place the physical entropy source into the state A and if the physical entropy source is in the state A, controlling the second logic means to place the physical entropy source into the state B, and b) determining whether the physical entropy source is in the state A or in the state B after action a is performed. The controller means is also for c) if the detected state of the physical entropy source is the state B and the determined state of the physical entropy source is the state B, outputting a first symbol and if the detected state of the physical entropy source is the state B and the determined state of the physical entropy source is the state A, outputting a second symbol and if the detected state of the physical entropy source is the state A and the determined state of the physical entropy source is the state A, outputting a third symbol and if the detected state of the physical entropy source is the state A and the determined state of the physical entropy source is the state B, outputting a fourth symbol, wherein the first, second, third and fourth symbols are mutually distinguishable. The controller means is also for d) placing the first and second symbols into a first queue, e) placing the third and fourth symbols into a second queue, f) extracting a pair of symbols from the first queue, g) generating a first value when the pair of symbols extracted from the first queue is a first queue first sequence and generating a second value different than the first value when the pair of symbols extracted from the first queue is a first queue second sequence, and h) outputting the first and second values as the random binary sequence.

Another aspect of the disclosure comprises a non-transient computer readable medium containing instructions that, when executed by a computer cause the computer to generate random binary sequences from first logic, second logic and from a physical entropy source having a state A and a state B, the states A and B being bi-stable states. The first logic places the physical entropy source into the state A with a first probability of less than 100% when the physical entropy source is in the state B and places the physical entropy source into the state A with a probability of 100% when the physical entropy source is in the state A, and the second logic places the physical entropy source into the state B with a second probability of less than 100% when the physical entropy source is in the state A and places the physical entropy source into the state B with a probability of 100% when the physical entropy source is in the state B. The instructions cause the computer to a) detect whether the physical entropy source is in the state A or in the state B, b) if the physical entropy source is in the state B, cause the first logic to place the physical entropy source into the state A and if the physical entropy source is in the state A, cause the second logic to place the physical entropy source into the state B. The instructions also cause the computer to c) determine whether the physical entropy source is in the state A or in the state B after causing the first logic to place the physical entropy source into the state A or after causing the second logic to place the physical entropy source into the state B, d) if the detected state of the physical entropy source is the state B and the determined state of the physical entropy source is the state B, output a first symbol and if the detected state of the physical entropy source is the state B and the determined state of the physical entropy source is the state A, output a second symbol, and if the detected state of the physical entropy source is the state A and the determined state of the physical entropy source is the state A, output a third symbol, and if the detected state of the physical entropy source is the state A and the determined state of the physical entropy source is the state B, output a fourth symbol, wherein the first, second, third and fourth symbols are mutually distinguishable. The instructions also cause the computer to e) place the first and second symbols into a first queue, f) place the third and fourth symbols into a second queue, g) repeat actions a-f a plurality of times, h) extract a pair of symbols from the first queue, i) generate a first value when the pair of symbols extracted from the first queue is a first queue first sequence and generate a second value different than the first value when the pair of symbols extracted from the first queue is a first queue second sequence different than the first queue first sequence; and j) output the first and second values as the random binary sequence.

BRIEF DESCRIPTION OF THE DRAWINGS

The accompanying drawings are presented to aid in the description of embodiments of the invention and are provided solely for illustration of the embodiments and not as limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 4:
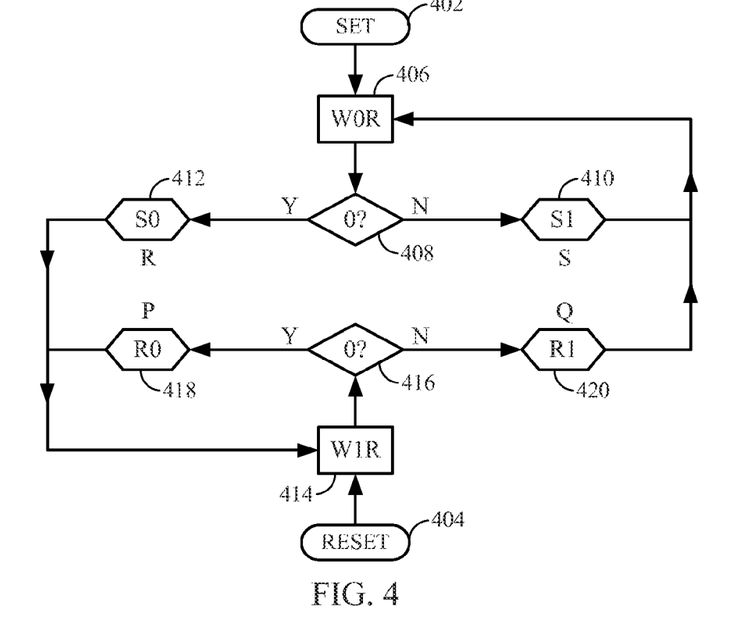
FIG. 4 is a state diagram illustrating a method of obtaining a Bernoulli sequence from a physical entropy device such as an STT-MTJ element according to a first embodiment.

FIG. 4 illustrates a series of actions related to setting the STT-MTJ element 100 to one of two different states (parallel/antiparallel) and producing one of four mutually distinguishable outputs based on the state of the STT-MTJ element 100 before and after the setting action occurs. Specifically, as discussed above, an STT-MTJ element can be in one of two states, parallel or antiparallel, which can represent a logical 0 or logical 1. These states are referred to hereinafter as "0" and "1" without regard to whether the 0 is represented by the parallel or antiparallel condition of the STT-MTJ element. "Setting" refers to placing the STT-MTJ element 100 into the 1 state; resetting refers to placing the STT-MTJ element 100 into the 0 state. The output of the logic will be represented as being one of four mutually distinguishable symbols, referred to herein after as outputs of "P," "Q," "R," and "S." These designations are for ease of reference, and the actual outputs could be, for example, voltage levels or other mutually distinguishable symbols that can be recognized and manipulated by a system performing a method according to this disclosure. As used in the drawings and hereinafter, the symbol "W" refers to performing a write operation, the symbol "R" refers to performing a read operation and the numeral 0 or 1 adjacent to an "W" or "R" indicates that a 0 or 1 is written or read. The sequence "W1R," for example, means "write the value 1 and then read the state of the STT-MTJ element 100 after the write operation."

In FIG. 4, a process begins with either a set operation 402 or a reset operation 404. In the set operation 402, the state of the STT-MTJ 100 is set to whichever one of the parallel and antiparallel states represents a logical 1. During this set operation, a current is applied for a sufficient amount of time that the probability of the STT-MTJ element 100 being in the 1 state after the set operation is substantially 100%. Alternately, during the reset operation 404, a current is applied for a sufficient time that the probability of the STT-MTJ element 100 being in the 0 state after the reset operation is substantially 100%. These set 402 and reset 404 actions are more time consuming than subsequent portions of the method of this embodiment, but, unlike conventional devices which require a set or reset operation after each bit is generated, in the present method the set 402 or reset 404 operations only occur once when the system is initialized. A given system only needs the ability to perform one of the set 402 and reset 404 actions—both types of actions are illustrated as available in FIG. 4, but a system will generally only perform one of these operations. The following discussion will therefore address the set operation 402 only.

After the set operation 402, the STT-MTJ element 100 will be in the 1 state. Write operations that attempt to write a 0 to the STT-MTJ element 100 when it is in the 1 state or that attempt to write a 1 to the STT-MTJ element 100 when it is in a 0 state will switch the state of the STT-MTJ element 100 with a probability of approximately 50%. Subsequent write operations that attempt to write a 0 to the STT-MTJ element 100 when it is already in the 0 state or write a 1 to the STT-MTJ element 100 when it is in the 1 state will leave the STT-MTJ element 100 in its existing state with 100% probability. The voltage or current level to use and the duration of the voltage or current pulse for causing this probabilistic switching is determined during a calibration process.

Block 406 indicates that a write operation is performed on the STT-MTJ element 100 while it is in the 1 state to attempt to switch it to the 0 state followed by a read operation. After writing 0 to the STT-MTJ element 100, at decision block 408 a determination is made as to whether the state of the MTJ is 0 or 1. If the state of the STT-MTJ element 100 is still 1 after the write operation, an output of "S," one of the four mutually distinguishable symbols discussed above, is output at block 410 to a second queue (a first-in-first-out or FIFO queue) 604 illustrated in FIG. 6 and the process returns to block 406 where a further WOR operation is performed. Assume that after this second WOR operation, it is determined at decision block 408 that the state of the STT-MTJ element 100 is now 0. In response to detecting the 0 state of the STT-MTJ element 100, an "R," which is another one of the four mutually distinguishable symbols, is output at block 412 to the second queue 604.

Now that the STT-MTJ element 100 is in a 0 state, a W1R operation is performed at block 414, and a determination is made at decision block 416 as to whether the STT-MTJ element 100 is in the 0 or 1 state. If it is determined at decision block 416 that the STT-MTJ element 100 remains in a 0 state, then a "P," yet another one of the four mutually distinguishable symbols, is output at block 418 to a first queue 602 in FIG. 6 and the process returns to block 414 where a second W1R operation is performed on the STT-MTJ element 100. At decision block 416 a determination is made as to whether the STT-MTJ element 100 is in the 0 or 1 state. Assume that the STT-MTJ element 100 is now in the 1 state after this write operation. In response to detecting a 1 state of the STT-MTJ element 100 after this latest write operation, a "Q," still yet another one of the four mutually distinguishable symbols, is output at block 420 to the first queue 602.

The foregoing discussion describes a process in which the various write operations produce the outputs S, R, P, Q in that order. Because the chance of the STT-MTJ element 100 switching states after any given write operation is approximately 50%, it is possible that certain symbols will be repeated; multiple S's may be generated, for example, if the WOR action at block 406 does not change the state of STT-MTJ element 100, and multiple P's may be generated if the W1R action at block 414 does not change the state of the STT-MTJ element 100. However, a Q output will always be followed by an R or an S, and an R output will always be followed by a P or a Q. The use of the two separate queues 602, 604 discussed hereinafter, is to segregate the output symbol P, Q, R and S into two groups/queues such that the symbols ({P, Q} or {R, S}) in each queue/group have the same common state for the symbols ({P, Q} or {R, S}). This allows a von Neumann random number extractor to be applied to each queue and allow random numbers to be generated from these outputs.

Figure 5:
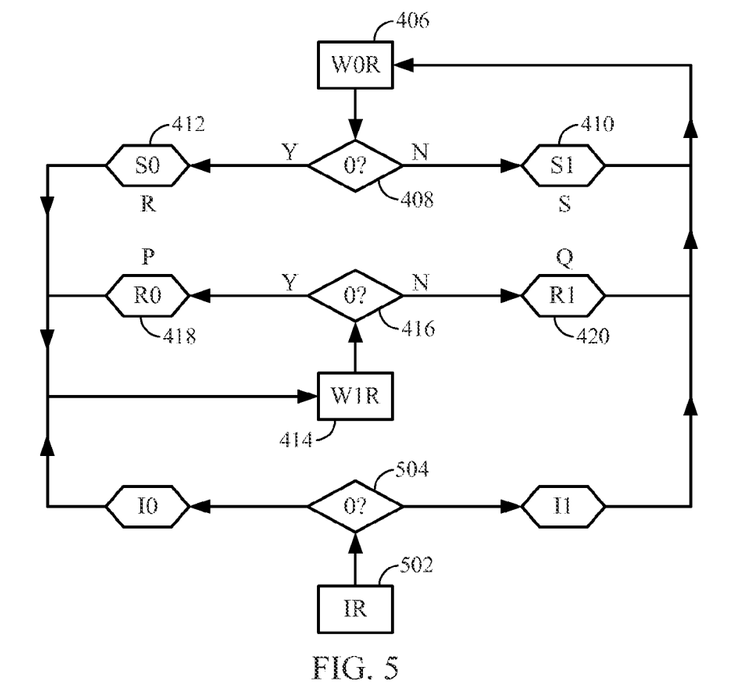
FIG. 5 is a state diagram illustrating a method of obtaining a Bernoulli sequence from a physical entropy device such as an STT-MTJ element according to a second embodiment.

Before describing the operation of the first and second queues 602, 604, a second procedure for generating the four mutually distinguishable symbols P, Q, R, S will be described with respect to FIG. 5. Blocks of this procedure that are the same as those of the above-described procedure are identified with like reference numerals. This procedure does not require an initial set or reset operation as described above. Instead, the procedure begins at block 502 where an initial read of the STT-MTJ element 100 is performed. If it is determined at a decision block 504 that the initial read shows that the STT-MTJ element 100 is in the 0 state, the process moves to block 414 where a W1R operation is performed and the procedure continues as discussed above. If it is determined during the initial read that the STT-MTJ element 100 is in the 1 state, the procedure shifts to block 406 where a WOR action is performed. Other than this initialization without a set or reset operation, the procedure of FIG. 5 is the same as that of FIG. 4.

Figure 6:
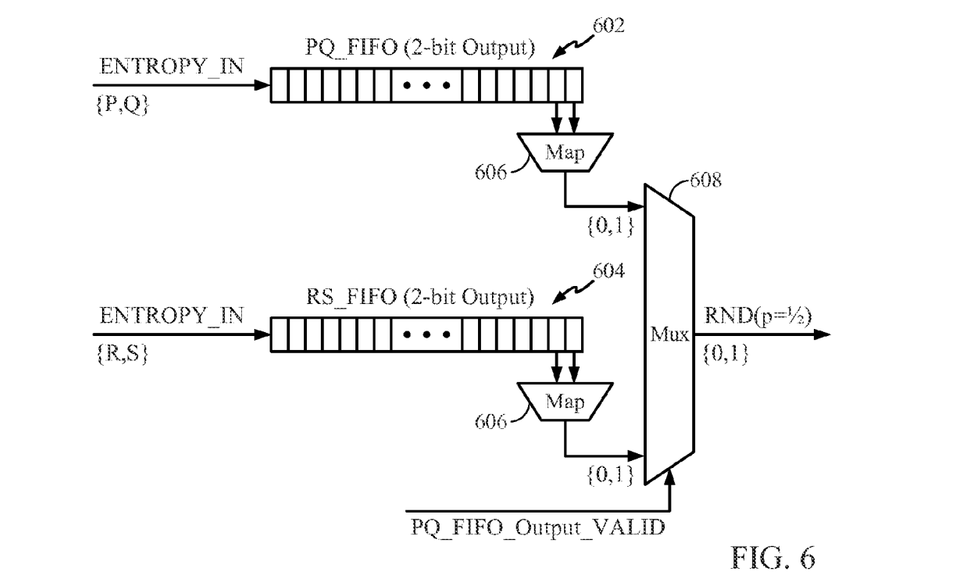
FIG. 6 is a schematic diagram of a system generating a stream of random bits from a pairwise comparison of bits in each of two queues of random bits.

The use of the mutually distinguishable symbols P, Q, R, S in the first queue 602 and the second queue 604 are now discussed with reference to FIG. 6. As described above, each of the first queue 602 and the second queue 604 is a FIFO queue that is filled with a series of symbols by the procedures of FIGS. 4 and 5. A mapping function 606 at the end of the first queue 602 extracts pairs of the symbols from the first queue 602 and compares them. If the pair of symbols has a first order (P,Q), the mapping function 606 outputs a logical 0 to a multiplexor 608; if the pair of symbols has a second order (Q,P), the mapping function outputs a logical 1 to the multiplexor 608. If the extracted pair of symbols is are same, either (P,P) or (Q,Q) one of three options is taken. A first option is to discard the matching pair of symbols, produce no output to the multiplexor 608 and retrieve a second pair of symbols from the first queue 602. As a second option, a "toggle" function can be performed in which the mapping function 606 outputs a 1 the first time a (P,P) sequence is detected and a 0 the next time a (P,P) sequence is detected. In a third option, a pseudo-random bit from a pseudo random number generator (not illustrated) such as a Linear Feedback Shift Register (LFSR) can be assigned to each (P,P) and each (Q,Q).

The sequence (Q,Q) is treated in a similar manner. This arrangement helps provide a constant random binary stream to the multiplexor 608. If pairs of identical symbols are discarded the method of the present invention can still be practiced, but it may be necessary to buffer incoming bits at the multiplexor 608 or the output of the multiplexor 608 may have stalls.

The second queue 604 processes pairs of the R and S symbols in a similar manner and outputs a 0 for the ordered pair (R,S), a 1 for the ordered pair (S,R) and either discards sequences having identical symbols (R,R) and (S,S) or performs a toggle function or assigns a pseudo random bit as discussed above. The first and second queues 602, 604, provide a random stream of 0's and 1's to the multiplexor 608, and the multiplexor 608 serializes these digits to form an output stream of true random bits. More than two bit streams can be multiplexed to generate a random bit stream at a rate higher than the rate at which any particular bit stream can be produced.

Figure 7:
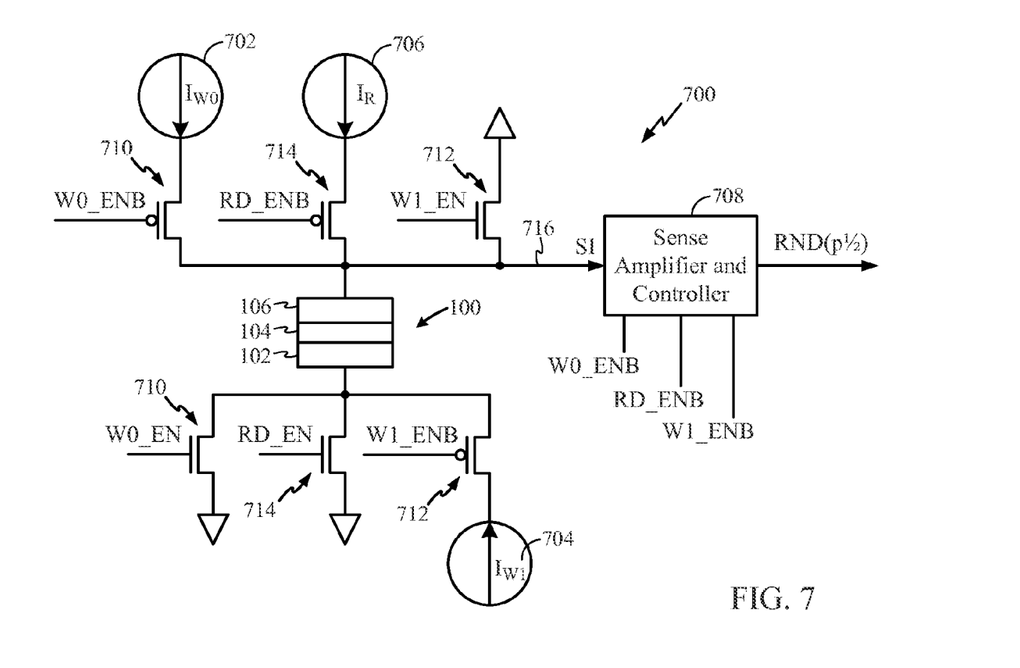
FIG. 7 is a circuit diagram illustrating an STT-MTJ element and control logic associated therewith for generating a Bernoulli sequence.

FIG. 7 shows a circuit 700 for controlling read and writes to the STT-MTJ element 100 and for generating a random bit stream. The circuit 700 may be embodied, for example, in a semiconductor die (not illustrated). Circuit 700 includes the STT-MTJ element 100, a write-0 (W0) current source 702, a write-1 (W1) current source 704, a read current source 706 and a controller 708, which may comprise or include a sense amplifier. A pair of write-0-enable (W0_ENB) switches 710 selectively connect the W0 current source 702 to the STT-MTJ element 100 to shift the STT-MTJ element 100 from parallel to antiparallel (or from antiparallel to parallel). A pair of write-1-enable (W1_ENB) switches 712 selectively connect the W1 current source 704 to the STT-MTJ element 100 to cause current to flow through the STT-MTJ element 100 in an opposite direction and switch the STT-MTJ element 100 to the opposite state from above. A pair of read-enable (RD_ENB) switches 714 supply a read current to the STT-MTJ element 100. The resistance of the STT-MTJ element 100 depends on whether it is in a parallel or antiparallel state, and this affects current flow through the STT-MTJ element 100 in a predictable manner that can be detected by the controller 708 which is connected to the read enable switches 714 by line 716. The read enable switches 714, write-0-enable switches 710 and write-1-enable switches 712 are controlled by the controller 708 to perform the method described above. The controller 708 thus controls the time that the various read and write enable switches are closed to set or reset the STT-MTJ element 100 with a probability of 100% or to switch the STT-MTJ element 100 with a probability of approximately 50%. The first and second queues 602, 604 and multiplexor 608 may be located in controller 708 or alternately may comprise separate logical elements under the control of the controller 708. The controller 708 includes all necessary logic, which may be implemented in hardware or software, to carry out the method of the present disclosure.

Figure 8A:
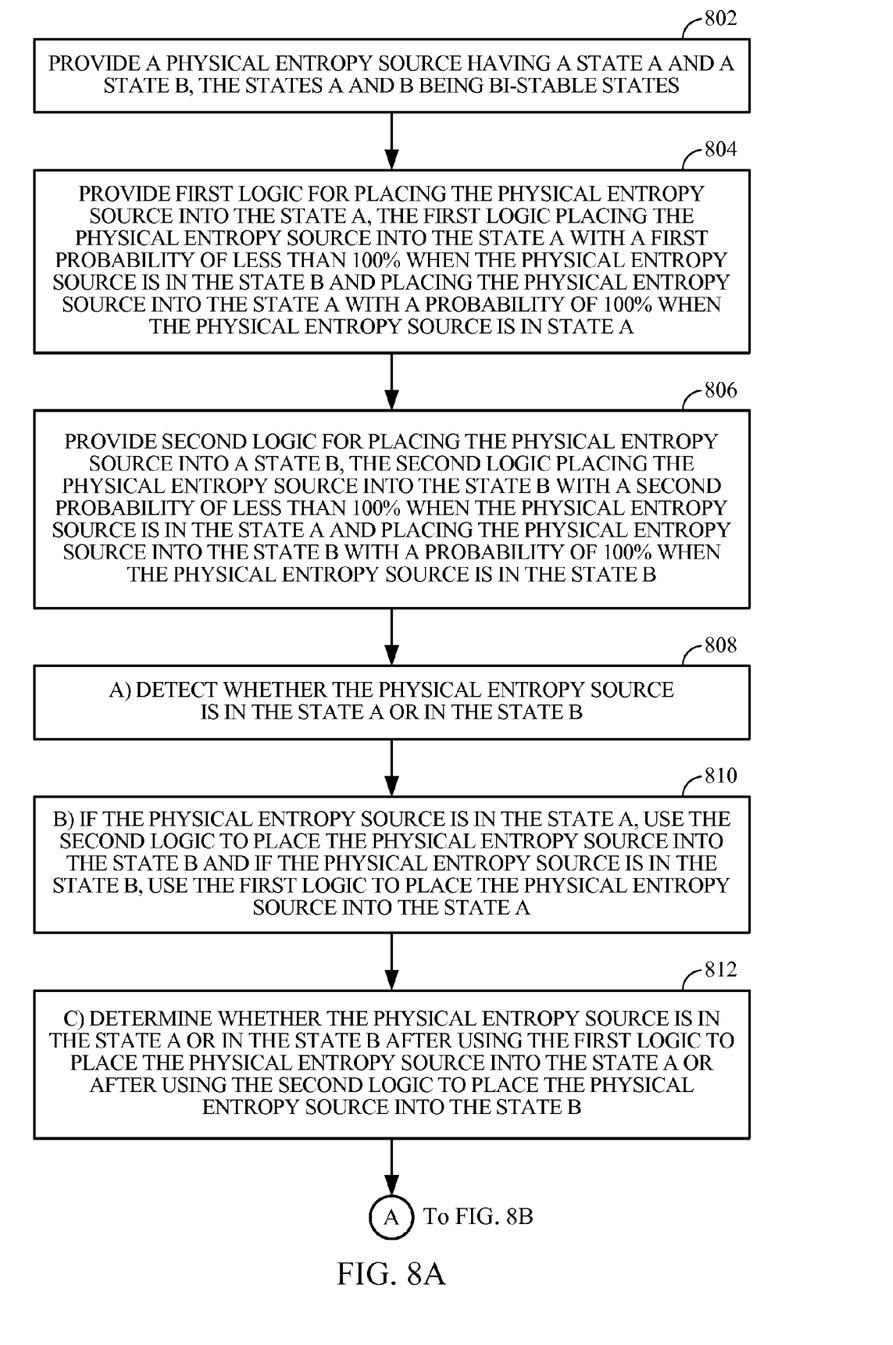
FIG. 8A and FIG. 8B are a flowchart illustrating a method according to an embodiment.
Figure 8B:
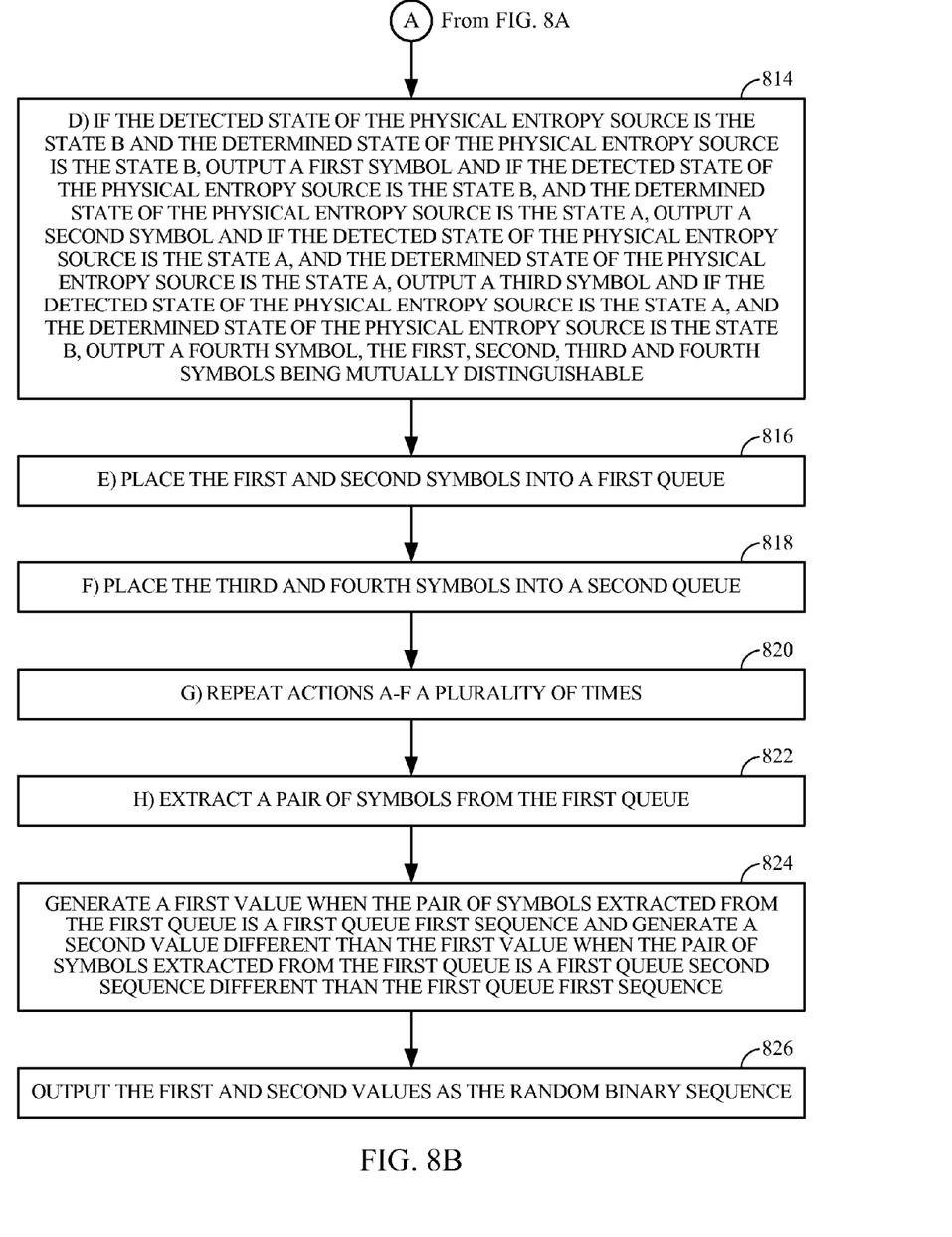

FIG. 8A and FIG. 8B illustrate a method of generating random binary sequences according to an embodiment that includes a block 802 of providing a physical entropy source having a state A and a state B, the states A and B being bi-stable states, and a block 804 of providing first logic for placing the physical entropy source into the state A. The first logic places the physical entropy source into the state A with a first probability of less than 100% when the physical entropy source is in the state B and places the physical entropy source into the state A with a probability of 100% when the physical entropy source is in state A. The method also includes a block 806 of providing second logic for placing the physical entropy source into a state B. The second logic places the physical entropy source into the state B with a second probability of less than 100% when the physical entropy source is in the state A and places the physical entropy source into the state B with a probability of 100% when the physical entropy source is in the state B. The method also includes a block 808 of detecting whether the physical entropy source is in the state A or in the state B, and a block 810 of, if the physical entropy source is in the state A, using the second logic to place the physical entropy source into the state B and if the physical entropy source is in the state B, using the first logic to place the physical entropy source into the state A. The method further includes a block 812 of determining whether the physical entropy source is in the state A or in the state B after using the first logic to place the physical entropy source into the state A or after using the second logic to place the physical entropy source into the state B. In addition, the method includes a block 814 of, if the detected state of the physical entropy source is the state B and the determined state of the physical entropy source is the state B, outputting a first symbol and if the detected state of the physical entropy source is the state B and the determined state of the physical entropy source is the state A, outputting a second symbol, and if the detected state of the physical entropy source is the state A and the determined state of the physical entropy source is the state A, outputting a third symbol, and if the detected state of the physical entropy source is the state A and the determined state of the physical entropy source is the state B, outputting a fourth symbol, wherein the first, second, third and fourth symbols are mutually distinguishable. The method also includes a block 816 of placing the first and second symbols into a first queue, a block 818 of placing the third and fourth symbols into a second queue, and a block 820 of repeating blocks 808-818 a plurality of times. The method further includes a block 822 of extracting a pair of symbols from the first queue, a block 824 of generating a first value when the pair of symbols extracted from the first queue is a first queue first sequence and generating a second value different than the first value when the pair of symbols extracted from the first queue is a first queue second sequence different than the first queue first sequence and a block 826 of outputting the first and second values as the random binary sequence. The method may further include extracting a pair of symbols from the second queue, generating the first value when the pair of symbols extracted from the second queue is a second queue first sequence and generating the second value when the pair of symbols extracted from the second queue is a second queue second sequence different than the second queue first sequence and outputting the first and second values as the random binary sequence.

Figure 9:
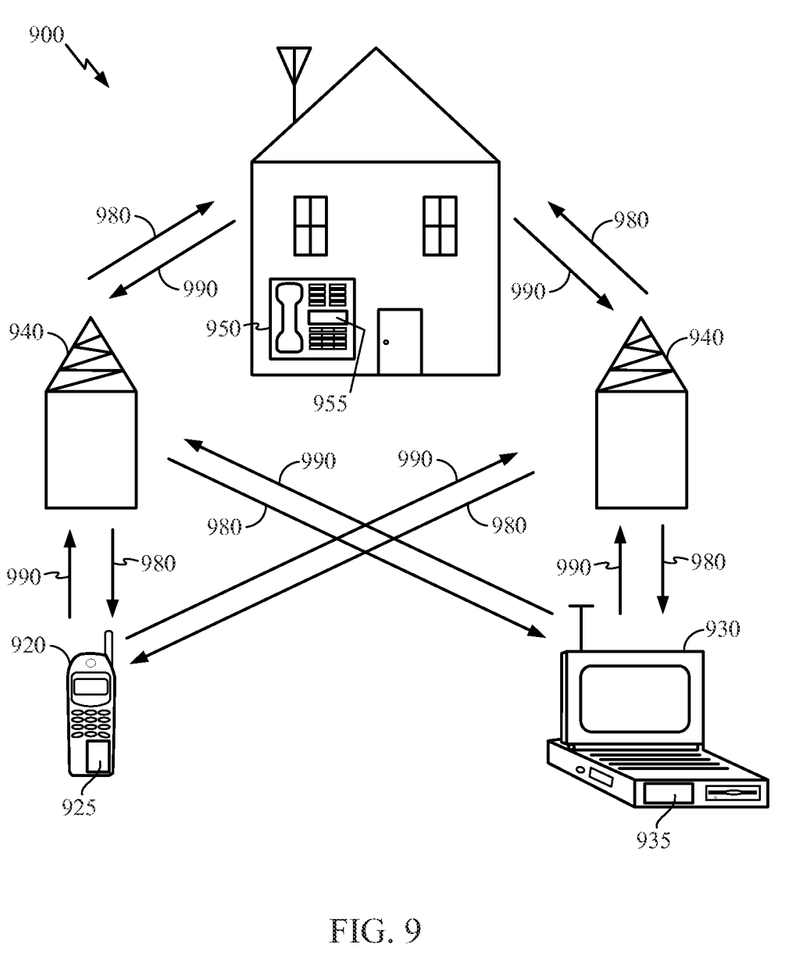
FIG. 9 is a schematic diagram of an exemplary wireless communication system in which embodiments of the disclosure may be used.

FIG. 9 illustrates an exemplary wireless communication system 900 in which one or more embodiments of the disclosure may be advantageously employed. For purposes of illustration, FIG. 9 shows three remote units 920, 930, and 950 and two base stations 940. It will be recognized that conventional wireless communication systems may have many more remote units and base stations. The remote units 920, 930, and 950 include integrated circuit or other semiconductor devices 925, 935 and 955 (including Bernoulli sequence generators as disclosed herein), which are among embodiments of the disclosure as discussed further below. FIG. 9 shows forward link signals 980 from the base stations 940 and the remote units 920, 930, and 950 and reverse link signals 990 from the remote units 920, 930, and 950 to the base stations 940.

In FIG. 9, the remote unit 920 is shown as a mobile telephone, the remote unit 930 is shown as a portable computer, and the remote unit 950 is shown as a fixed location remote unit in a wireless local loop system. For example, the remote units may be any one or combination of a communications device, mobile phone, hand-held personal communication system (PCS) unit, portable data unit such as a personal digital or personal data assistant (PDA), navigation device (such as GPS enabled devices), set top box, music player, video player, entertainment unit, fixed location data unit such as meter reading equipment, or any other device that stores or retrieves data or computer instructions, or any combination thereof. Although FIG. 9 illustrates remote units according to the teachings of the disclosure, the disclosure is not limited to these exemplary illustrated units. Embodiments of the disclosure may be suitably employed in any device having active integrated circuitry including memory and on-chip circuitry for test and characterization.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for generating a Bernoulli sequence. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for generating a random binary sequence, the method comprising:
   providing a physical entropy source having a state A and a state B, the states A and B being bi-stable states, the physical entropy source being a physical device in which switching between the states is probabilistic and unpredictable;
   providing first logic for placing the physical entropy source into the state A, the first logic placing the physical entropy source into the state A with a first probability of less than 100% when the physical entropy source is in the state B and placing the physical entropy source into the state A with a probability of 100% when the physical entropy source is in the state A;
   providing second logic for placing the physical entropy source into a state B, the second logic placing the physical entropy source into the state B with a second probability of less than 100% when the physical entropy source is in the state A and placing the physical entropy source into the state B with a probability of 100% when the physical entropy source is in the state B;
   a) detecting whether the physical entropy source is in the state A or in the state B;
   b) if the physical entropy source is in the state B, using the first logic to place the physical entropy source into the state A and if the physical entropy source is in the state A, using the second logic to place the physical entropy source into the state B;
   c) determining whether the physical entropy source is in the state A or in the state B after using the second logic to place the physical entropy source into the state B or after using the first logic to place the physical entropy source into the state A;
   d) if the detected state of the physical entropy source is the state B and the determined state of the physical entropy source is the state B, outputting a first symbol and if the detected state of the physical entropy source is the state B and the determined state of the physical entropy source is the state A, outputting a second symbol, and if the detected state of the physical entropy source is the state A and the determined state of the physical entropy source is the state A, outputting a third symbol, and if the detected state of the physical entropy source is the state A and the determined state of the physical entropy source is the state B, outputting a fourth symbol, the first, second, third and fourth symbols being mutually distinguishable;
   e) placing the first symbol and the second symbol into a first queue;
   f) placing the third symbol and the fourth symbol into a second queue;
   g) repeating actions a-f a plurality of times;
   h) extracting a pair of symbols from the first queue;
   i) generating a first value when the pair of symbols extracted from the first queue is a first queue first sequence and generating a second value different than the first value when the pair of symbols extracted from the first queue is a first queue second sequence different than the first queue first sequence; and
   j) outputting the first value and the second value as the random binary sequence.

2. The method of claim 1 including, before i, comparing the symbols in the pair of symbols extracted from the first queue and discarding the extracted pair of symbols if the symbols in the pair of symbols extracted from the first queue are identical.

3. The method of claim 1 including, before i, comparing the symbols in the pair of symbols extracted from the first queue and, if the extracted pair of symbols are identical, outputting the first value a first time one identical pair of symbols is detected and outputting the second value a second time the one identical pair of symbols is detected.

4. The method of claim 1 including, before i, comparing the symbols in the pair of symbols extracted from the first queue and, if the extracted pair of symbols are identical, generating and outputting a pseudo random bit.

5. The method of claim 1, including:
extracting a pair of symbols from the second queue; and
generating the first value when the pair of symbols extracted from the second queue is a second queue first sequence and generating the second value when the pair of symbols extracted from the second queue is a second queue second sequence different than the second queue first sequence.

6. The method of claim 5 including, comparing the symbols in the pair of symbols extracted from the second queue and discarding the pair of symbols extracted from the second queue if the symbols in the pair of symbols extracted from the second queue are identical.

7. The method of claim 5 including, comparing the symbols in the pair of symbols extracted from the second queue and, if the symbols in the pair of symbols extracted from the second queue are identical, outputting the first value a first time one identical pair of symbols is detected and outputting the second value a second time the one identical pair of symbols is detected.

8. The method of claim 5 including, comparing the symbols in the pair of symbols extracted from the second queue and, if the symbols in the pair of symbols extracted from the second queue are identical, generating and outputting a pseudo random bit.

9. The method of claim 1, wherein the random binary sequence comprises a stream multiplexed from the first value and the second value generated from the first queue and from the first value and the second value generated from the second queue.

10. The method of claim 9, wherein the physical entropy source comprises a magnetic tunnel junction.

11. The method of claim 10, wherein magnetic tunnel junction comprises a spin-torque transfer magnetic tunnel junction.

12. The method of claim 1, wherein extracting a pair of symbols from the first queue comprise extracting a pair of symbols from the first queue in a first-in-first-out manner.

13. An apparatus for generating a random binary sequence, the apparatus comprising:
a physical entropy source having a state A and a state B, the states A and B being bi-stable states, the physical entropy source being a physical device in which switching between the states is probabilistic and unpredictable;
first logic configured to place the physical entropy source into the state A, the first logic being configured to place the physical entropy source into the state A with a first probability of less than 100% when the physical entropy source is in the state B and to place the physical entropy source into the state A with a probability of 100% when the physical entropy source is in the state A;
second logic configured to place the physical entropy source into a state B, the second logic configured to place the physical entropy source into the state B with a second probability of less than 100% when the physical entropy source is in the state A and to place the physical entropy source into the state B with a probability of 100% when the physical entropy source is in the state B; and
a controller configured to:
a) detect whether the physical entropy source is in the state A or in the state B and, if the physical entropy source is in the state B, to control the first logic to place the physical entropy source into the state A and if the physical entropy source is in the state A, to control the second logic to place the physical entropy source into the state B; and
b) determine whether the physical entropy source is in the state A or in the state B after action a is performed;
c) if the detected state of the physical entropy source is the state B and the determined state of the physical entropy source is the state B, to output a first symbol and if the detected state of the physical entropy source is the state B and the determined state of the physical entropy source is the state A, to output a second symbol and if the detected state of the physical entropy source is the state A and the determined state of the physical entropy source is the state A, to output a third symbol and if the detected state of the physical entropy source is the state A and the determined state of the physical entropy source is the state B, to output a fourth symbol, the first, second, third and fourth symbols being mutually distinguishable;
d) place the first symbol and the second symbol into a first queue;
e) place the third symbol and the fourth symbol into a second queue;
f) extract a pair of symbols from the first queue;
g) generate a first value when the pair of symbols extracted from the first queue is a first queue first sequence and generate a second value different than the first value when the pair of symbols extracted from the first queue is a first queue second sequence; and
h) output the first value and the second value as the random binary sequence.

14. The apparatus of claim 13, wherein the controller is further configured to compare the symbols in the pair of symbols extracted from the first queue and discard the extracted pair of symbols if the symbols in the pair of symbols extracted from the first queue are identical.

15. The apparatus of claim 13, wherein the controller is further configured to compare the symbols in the pair of symbols extracted from the first queue and, if the extracted pair of symbols are identical, output the first value a first time one identical pair of symbols is detected and output the second value a second time the one identical pair of symbols is detected.

16. The apparatus of claim 13, wherein the controller is further configured to compare the symbols in the pair of symbols extracted from the first queue and, if the extracted pair of symbols are identical, generate and output a pseudo random bit.

17. The apparatus of claim 13, wherein the controller is further configured to:
extract a pair of symbols from the second queue; and
generate the first value when the pair of symbols extracted from the second queue is a second queue first sequence and generate the second value when the pair of symbols extracted from the second queue is a second queue second sequence different than the second queue first sequence.

18. The apparatus of claim 17, wherein the controller is further configured to compare the symbols in the pair of symbols extracted from the second queue and discard the extracted pair of symbols if the symbols in the pair of symbols extracted from the second queue are identical.

19. The apparatus of claim 17, wherein the controller is further configured to compare the symbols in the pair of symbols extracted from the second queue and, if the symbols in the pair of symbols extracted from the second queue are identical, output the first value a first time one identical pair of symbols is detected and output the second value a second time the one identical pair of symbols is detected.

20. The apparatus of claim 17, wherein the controller is further configured to compare the symbols in the pair of symbols extracted from the second queue and, if the symbols in the pair of symbols extracted from the second queue are identical, generate and output a pseudo random bit.

21. The apparatus of claim 13 further including a multiplexor configured to receive generated values from the first queue and generated values from the second queue and output a random binary stream from received generated values.

22. The apparatus of claim 13, wherein the physical entropy source comprises a magnetic tunnel junction.

23. The apparatus of claim 22, wherein the magnetic tunnel junction comprises a spin-torque transfer magnetic tunnel junction.

24. The apparatus of claim 13 integrated into at least one semiconductor die.

25. A device, selected from a group consisting of a set top box, a music player, a video player, an entertainment unit, a navigation device, a communications device, a personal digital assistant (PDA), a fixed location data unit, and a computer, including the apparatus for generating a random binary sequence of claim 13.

26. A method for generating a random binary sequence, the method comprising:
   steps for providing a physical entropy source having a state A and a state B, the states A and B being bi-stable states, the physical entropy source being a physical device in which switching between the states is probabilistic and unpredictable;
   steps for providing first logic for placing the physical entropy source into the state A, the first logic placing the physical entropy source into the state A with a first probability of less than 100% when the physical entropy source is in the state B and placing the physical entropy source into the state A with a probability of 100% when the physical entropy source is in the state A;
   steps for providing second logic for placing the physical entropy source into a state B, the second logic placing the physical entropy source into the state B with a second probability of less than 100% when the physical entropy source is in the state A and placing the physical entropy source into the state B with a probability of 100% when the physical entropy source is in the state B;
   a) steps for detecting whether the physical entropy source is in the state A or in the state B;
   b) if the physical entropy source is in the state B, steps using the first logic to place the physical entropy source into the state A and if the physical entropy source is in the state A, using the second logic to place the physical entropy source into the state B;
   c) steps for determining whether the physical entropy source is in the state A or in the state B after using the first logic to place the physical entropy source into the state A or after using the second logic to place the physical entropy source into the state B;
   d) if the detected state of the physical entropy source is the state B and the determined state of the physical entropy source is the state B, steps for outputting a first symbol and if the detected state of the physical entropy source is the state B and the determined state of the physical entropy source is the state A, steps for outputting a second symbol, and if the detected state of the physical entropy source is the state A and the determined state of the physical entropy source is the state A, steps for outputting a third symbol, and if the detected state of the physical entropy source is the state A and the determined state of the physical entropy source is the state B, steps for outputting a fourth symbol, the first, second, third and fourth symbols being mutually distinguishable;
   e) steps for placing the first symbol and the second symbol into a first queue;
   f) steps for placing the third symbol and the fourth symbol into a second queue;
   g) steps for repeating actions a-f a plurality of times;
   h) steps for extracting a pair of symbols from the first queue;
   i) steps for generating a first value when the pair of symbols extracted from the first queue is a first queue first sequence and steps for generating a second value different than the first value when the pair of symbols extracted from the first queue is a first queue second sequence different than the first queue first sequence; and
   j) steps for outputting the first value and the second value as the random binary sequence.

27. The method of claim 26 including, before i, steps for comparing the symbols in the pair of symbols extracted from the first queue and steps for discarding the extracted pair of symbols if the symbols in the pair of symbols extracted from the first queue are identical.

28. The method of claim 26 including, before i, steps for comparing the symbols in the pair of symbols extracted from the first queue and, if the extracted pair of symbols are identical, steps for outputting the first value a first time one identical pair of symbols is detected and steps for outputting the second value a second time the one identical pair of symbols is detected.

29. The method of claim 26 including, before i, steps for comparing the symbols in the pair of symbols extracted from the first queue and, if the extracted pair of symbols are identical, steps for generating and outputting a pseudo random bit.

30. An apparatus configured to generate a random binary sequence, the apparatus comprising:
   a physical entropy source having a state A and a state B, the states A and B being bi-stable states, the physical entropy source being a physical device in which switching between the states is probabilistic and unpredictable;
   first logic means for placing the physical entropy source into the state A, the first logic means being for placing the physical entropy source into the state A with a first probability of less than 100% when the physical entropy source is in the state B and for placing the physical entropy source into the state A with a probability of 100% when the physical entropy source is in the state A;
   second logic means for placing the physical entropy source into a state B, the second logic means placing the physical entropy source into the state B with a second probability of less than 100% when the physical entropy source is in the state A and placing the physical entropy source into the state B with a probability of 100% when the physical entropy source is in the state B; and controller means for:
  a) detecting whether the physical entropy source is in the state A or in the state B and, if the physical entropy source is in the state B, controlling the first logic means to place the physical entropy source into the state A and if the physical entropy source is in the state A, controlling the second logic means to place the physical entropy source into the state B; and
  b) determining whether the physical entropy source is in the state A or in the state B after action a is performed;
  c) if the detected state of the physical entropy source is the state B and the determined state of the physical entropy source is the state B, outputting a first symbol and if the detected state of the physical entropy source is the state B and the determined state of the physical entropy source is the state A, outputting a second symbol, and if the detected state of the physical entropy source is the state A and the determined state of the physical entropy source is the state A, outputting a third symbol, and if the detected state of the physical entropy source is the state A and the determined state of the physical entropy source is the state B, outputting a fourth symbol, the first, second, third and fourth symbols being mutually distinguishable;
  d) placing the first symbol and the second symbol into a first queue;
  e) placing the third symbol and the fourth symbol into a second queue;
  f) extracting a pair of symbols from the first queue;
  g) generating a first value when the pair of symbols extracted from the first queue is a first queue first sequence and generating a second value different than the first value when the pair of symbols extracted from the first queue is a first queue second sequence; and
  h) outputting the first value and the second value as the random binary sequence.

31. The apparatus of claim 30, wherein the controller means is further for comparing the symbols in the pair of symbols extracted from the first queue and discarding the extracted pair of symbols if the symbols in the pair of symbols extracted from the first queue are identical.

32. The apparatus of claim 30, wherein the controller means is further for comparing the symbols in the pair of symbols extracted from the first queue and, if the extracted pair of symbols are identical, outputting the first value a first time one identical pair of symbols is detected and outputting the second value a second time the one identical pair of symbols is detected.

33. The apparatus of claim 30, wherein the controller means is further for comparing the symbols in the pair of symbols extracted from the first queue and, if the extracted pair of symbols are identical, generating and outputting a pseudo random bit.

34. A non-transient computer readable medium containing instructions that, when executed by a computer cause the computer to generate a random binary sequence from first logic, second logic and from a physical entropy source having a state A and a state B,
the states A and B being bi-stable states,
the physical entropy source being a physical device in which switching between the states is probabilistic and unpredictable,
the first logic placing the physical entropy source into the state A with a first probability of less than 100% when the physical entropy source is in the state B and places the physical entropy source into the state A with a probability of 100% when the physical entropy source is in the state A, and
the second logic placing the physical entropy source into the state B with a second probability of less than 100% when the physical entropy source is in the state A and places the physical entropy source into the state B with a probability of 100% when the physical entropy source is in the state, and
the instructions comprising instructions for:
a) detecting whether the physical entropy source is in the state A or in the state B;
b) if the physical entropy source is in the state B, using the first logic to place the physical entropy source into the state A and if the physical entropy source is in the state A, using the second logic to place the physical entropy source into the state B;
c) determining whether the physical entropy source is in the state A or in the state B after causing the first logic to place the physical entropy source into the state B or after causing the second logic to place the physical entropy source into the state A;
d) if the detected state of the physical entropy source is the state B and the determined state of the physical entropy source is the state B, outputting a first symbol and if the detected state of the physical entropy source is the state B and the determined state of the physical entropy source is the state A, outputting a second symbol, and if the detected state of the physical entropy source is the state A and the determined state of the physical entropy source is the state A, outputting a third symbol, and if the detected state of the physical entropy source is the state A and the determined state of the physical entropy source is the state B, outputting a fourth symbol, the first, second, third and fourth symbols being mutually distinguishable;
e) placing the first symbol and the second symbol into a first queue;
f) placing the third symbol and the fourth symbol into a second queue;
g) repeating actions a-f a plurality of times;
h) extracting a pair of symbols from the first queue;
i) generating a first value when the pair of symbols extracted from the first queue is a first queue first sequence and generating a second value different than the first value when the pair of symbols extracted from the first queue is a first queue second sequence different than the first queue first sequence; and
j) outputting the first value and the second value as the random binary sequence.

* * * * *